(12) United States Patent
 Phillips

(10) Patent No.: US 9,342,078 B2
(45) Date of Patent: *May 17, 2016

(54) REMOTE CONTROL OF FLUID-HANDLING DEVICES

(71) Applicant: AmpliSine Labs, LLC., Lubbock, TX (US)

(72) Inventor: Aaron Phillips, Lubbock, TX (US)

(73) Assignee: AmpliSine Labs, LLC, Lubbock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,190

(22) Filed: Jan. 3, 2014

(65) Prior Publication Data

US 2014/0163749 A1    Jun. 12, 2014

Related U.S. Application Data

(63) Continuation of application No. 13/708,557, filed on Dec. 7, 2012, now Pat. No. 8,649,909.

(51) Int. Cl.
  *G05D 7/00*  (2006.01)
  *G05D 7/06*  (2006.01)
  *E21B 47/00* (2012.01)
  *G05B 9/02*  (2006.01)

(52) U.S. Cl.
  CPC .............. *G05D 7/0676* (2013.01); *E21B 47/00* (2013.01); *G05B 9/02* (2013.01); *G05B 2219/23472* (2013.01); *G05B 2219/25204* (2013.01); *G05B 2219/31369* (2013.01)

(58) Field of Classification Search
  None
  See application file for complete search history.

(56) References Cited

U.S. PATENT DOCUMENTS

| 4,052,703 | A | * | 10/1977 | Collins et al. | 714/2 |
| 5,149,443 | A | * | 9/1992 | Varnam | 210/739 |
| 5,732,776 | A | * | 3/1998 | Tubel et al. | 166/250.15 |
| 6,061,603 | A | * | 5/2000 | Papadopoulos et al. | 700/83 |
| 6,192,980 | B1 | * | 2/2001 | Tubel et al. | 166/65.1 |
| 6,801,135 | B2 | * | 10/2004 | Schultz et al. | 340/853.1 |
| 6,913,083 | B2 | * | 7/2005 | Smith | 166/336 |
| 7,148,812 | B2 | * | 12/2006 | Baggs | 340/853.7 |
| 7,289,994 | B2 | * | 10/2007 | Nixon et al. | |
| 7,845,404 | B2 | * | 12/2010 | McStay et al. | 166/250.01 |
| 7,921,916 | B2 | * | 4/2011 | Lovell et al. | 166/336 |
| 7,931,090 | B2 | * | 4/2011 | Smedstad et al. | 166/366 |
| 7,958,938 | B2 | * | 6/2011 | Crossley et al. | 166/366 |
| 7,967,066 | B2 | * | 6/2011 | Mcstay et al. | 166/250.01 |
| 8,131,510 | B2 | * | 3/2012 | Wingky et al. | 702/188 |
| 8,179,279 | B2 | * | 5/2012 | Voss | 340/854.6 |
| 8,290,737 | B2 | * | 10/2012 | Davis | 702/119 |
| 8,312,320 | B2 | * | 11/2012 | Almadi et al. | 714/15 |

(Continued)

FOREIGN PATENT DOCUMENTS

WO    WO 2008/124765 A1 * 10/2008

*Primary Examiner* — Christopher E Everett
(74) *Attorney, Agent, or Firm* — Pillsbury Winthrop Shaw Pittman LLP

(57) ABSTRACT

Provided is a process, including: receiving, via the network interface, from a remote user device, a command to change a state of the fluid-handling device to a target state; translating the received command into a translated command operative to cause a local controller of the fluid-handling device to drive the fluid-handling equipment to the target state, the local controller being responsive to the command and feedback from the fluid-handling device indicative of whether the fluid-handling device is in the target state; and sending the translated command to the local controller.

39 Claims, 3 Drawing Sheets

(56) References Cited

U.S. PATENT DOCUMENTS

| | | | |
|---|---|---|---|
| 8,373,418 B2* | 2/2013 | Davey | 324/366 |
| 8,386,059 B2* | 2/2013 | Boone | 700/65 |
| 2001/0032518 A1* | 10/2001 | Boger et al. | 73/861 |
| 2002/0112860 A1* | 8/2002 | McDaniel | 166/381 |
| 2004/0231851 A1* | 11/2004 | Silvers | 166/350 |
| 2004/0262008 A1* | 12/2004 | Deans et al. | 166/339 |
| 2005/0096846 A1* | 5/2005 | Koithan et al. | 702/6 |
| 2009/0055029 A1* | 2/2009 | Roberson et al. | 700/282 |
| 2009/0149969 A1* | 6/2009 | Slupphaug et al. | 700/42 |
| 2010/0147510 A1* | 6/2010 | Kwok et al. | 166/250.01 |
| 2011/0231024 A1* | 9/2011 | Medizade | 700/282 |

* cited by examiner

REMOTE CONTROL OF FLUID-HANDLING DEVICES

CROSS-REFERENCE TO RELATED APPLICATIONS

The present application is a continuation of U.S. patent application Ser. No. 13/708,557, filed 7 Dec. 2012, and titled REMOTE CONTROL OF FLUID-HANDLING DEVICES, the entire contents of which are hereby incorporated by reference for all purposes.

BACKGROUND OF THE INVENTION

1. Field of the Invention

The present invention relates generally to fluid-handling devices and, more specifically, to remote control of fluid-handling devices.

2. Description of the Related Art

Fluid-handling devices, such as valves, pumps, and various other forms of process equipment, in many use cases, are widely geographically distributed. For example, when such devices are used to extract petroleum products from an oil well, the associated fluid source or receptacle may be in a relatively remote location, as oil wells are generally distributed relative to one another and located remote from metropolitan areas. Similar issues arise in relation to petro-water disposal facilities, re-injection facilities, and petroleum pumping stations, all of which tend to be geographically distributed and include fluid-handling equipment.

When monitoring or controlling such sites, it can be time-consuming and expensive for a technician to manually adjust or otherwise control fluid-handling devices, as the technician will incur costs and delays by traveling to the device to make adjustments or gather data in person. And these adjustments and inspections often occur relatively frequently, as process conditions and market demand fluctuate, thereby further increasing costs.

Some systems exist for exercising remote monitoring of fluid-handling devices, such as various supervisory control and data acquisition (SCADA) systems, but many of these systems fail when a network connection is lost. Remote logic controlling such systems generally ceases to exercise control when the remote logic is disconnected in the event of a network failure. Further, some SCADA systems require the installation of special-purpose software on a computing device in order to exercise control remotely, which tends to deter users from exercising remote control of fluid-handling devices due to the burden of configuring each computer from which remote control is exercised.

SUMMARY OF THE INVENTION

The following is a non-exhaustive listing of some aspects of the present techniques. These and other aspects are described in the following disclosure.

In some aspects, the present techniques include a system for remotely controlling fluid-handling device of an oil well, a petro water disposal or re-injection facility, or a petroleum pumping station, the system including: an input/output module operable to communicate with a fluid-handling device; a network interface; memory; and one or more processors communicatively coupled to the input/output module, the network interface, and the memory, wherein the memory stores instructions that when executed by the processors cause the processors to effectuate steps including: receiving, via the network interface, from a remote user device, a command to change a state of the fluid-handling device to a target state; translating the received command into a translated command operative to cause a local controller of the fluid-handling device to drive the fluid-handling equipment to the target state, the local controller being responsive to the command and feedback from the fluid-handling device indicative of whether the fluid-handling device is in the target state; and sending the translated command to the local controller.

Some aspects include a tangible, non-transitory machine-readable medium storing instructions that when executed by a data processing apparatus cause the data processing apparatus to perform operations including: receiving, via the network interface, from a remote user device, a command to change a state of the fluid-handling device to a target state; translating the received command into a translated command operative to cause a local controller of the fluid-handling device to drive the fluid-handling equipment to the target state, the local controller being responsive to the command and feedback from the fluid-handling device indicative of whether the fluid-handling device is in the target state; and sending the translated command to the local controller.

Some aspects include a process, including: receiving, via the network interface, from a remote user device, a command to change a state of the fluid-handling device to a target state; translating the received command into a translated command operative to cause a local controller of the fluid-handling device to drive the fluid-handling equipment to the target state, the local controller being responsive to the command and feedback from the fluid-handling device indicative of whether the fluid-handling device is in the target state; and sending the translated command to the local controller.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
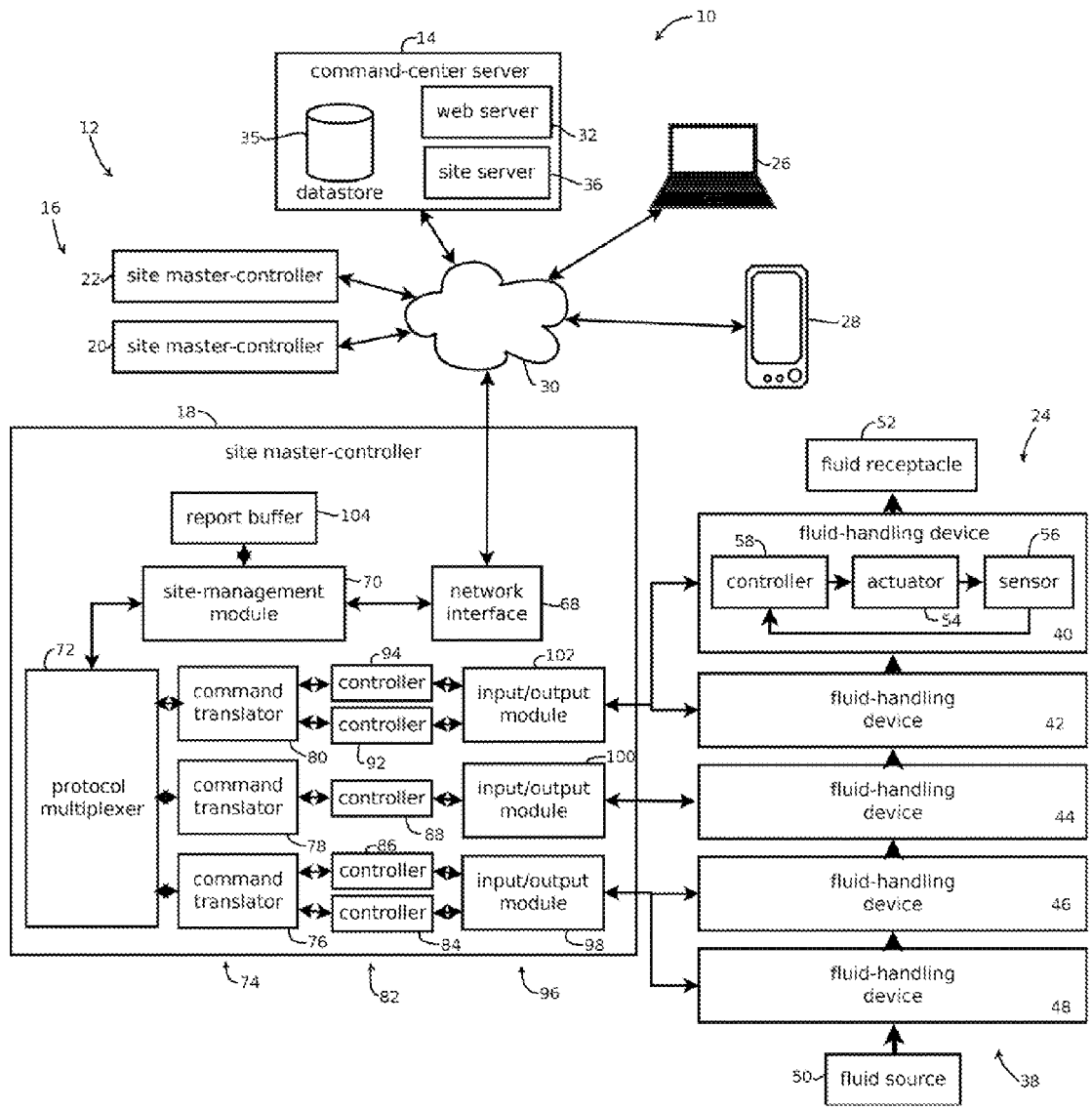
FIG. 1 illustrates an example of a command-center server and site master-controller in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1 illustrates a computing environment 10 having a control system 12 that, in some implementations, addresses some or all of the above-mentioned deficiencies in certain SCADA systems for exercising remote control of fluid-handling devices. As explained in greater detail below, the control system 12 of this embodiment includes a command-center server 14 and site master-controllers 16 (specifically, in this example, three such site master-controllers 18, 20, and 22) that cooperate to facilitate remote control at a fluid-handling site 24 from user devices 26 or 28 via the Internet 30. Each site master-controller 16 may be co-located with a corresponding fluid-handling site 24 and, in some embodiments, may include logic that implements remotely issued commands, such that once a command is issued from user devices 26 or 28 and received at a site master-controller 16, the site master-controller 16, in some embodiments, executes the command to completion, even if Internet access is lost before the command is fully executed. Further, the site master-controller 16 of some embodiments may be operative to translate commands into various device-specific protocols, such that a single implementation of the site master-controller 16 is relatively versatile regardless of the type of fluid-handling device being controlled. And in some implementations, the command-center server 14 may be operative to present a command interface and receive commands via a web interface in a web browser on user devices 26 and 28, such that fluid-handling devices can be controlled remotely without the need to install special-purpose software on the computing device through which remote control is exercised. It should be noted, however, that not all embodiments provide all of these benefits, as various engineering and cost trade-offs are envisioned, and some embodiments may provide other or none of these benefits.

In some embodiments, the command-center server 14 includes a web server 32, a data store 34, and a site server 36. The command-center server 14 may act as a central node through which any of a plurality of user devices, such as user devices 26 and 28 (e.g., laptops, tablets, desktop computers, smartphones, and the like), issue commands to any of a plurality site master-controller 16, provided that such access is authorized. Only two user devices and three site master-controllers are shown for simplicity of explanation, but implementations including substantially more of each are envisioned, such as more than several hundred or several thousand user devices and more than several hundred or several thousand site master-controllers, for example. That said, embodiments are also consistent with a single user device and a single site master-controller.

The illustrated web server 32 may be operative to send instructions to present a control interface on the user devices 26 and 28, for example in a web browser on an operating system executed by processors and stored by memory of the user devices 26 or 28. The web server 32 may be operative to receive a request for such an interface from one of the user devices 26 or 28, send instructions (for example HTML JavaScript, and cascading stylesheets) to the user devices 26 that when rendered in a browser of the user devices 26 or 28, presents the control interface. The control interface may include buttons, text-input fields, and the like, that when interacted with by a user (e.g., touching, clicking, keying in text, and the like) generated events handled by the control interface and which cause corresponding commands to be sent from the user devices 26 or 28 to the command-center server 14. Other embodiments may have a special-purpose application executing on the user devices 26 and 28 for presenting the control interface and sending commands to the command-center server 14, e.g., a smartphone app that communicates via a web-based application program interface. The command-center server may interact with the user devices 26 and 28 via an Internet Protocol (IP) address of the command-center server and a port, such as port 80, which may be different from a port by which the command-center server 14 communicates with the various site master-controller 16, as described below, to keep traffic from the different components separate.

The web server 32 may also be operative to send instructions to present reports, and interfaces by which such reports are selected, to the user devices 26 or 28 responsive to user requests for such information or interfaces. As explained in greater detail below, the site master-controller 16 may report various process data, and the web server 32 may present this process data to users upon request. This process data may be stored in the data store 34.

In the data store 34 of some embodiments, the site master-controllers 16 may be organized according to user accounts, with each site master-controller 16 corresponding to at least one user account and some user accounts corresponding to multiple site master-controllers 16, as some users may have, for example, a plurality of oil wells or other facilities which the user wishes to control or monitor. In some embodiments, the data store 34 includes a plurality of account records, each account record having one or more user names, one or more user passwords, billing information (e.g., billing address, subscription price, and invoicing data), and identifiers of one or more site master-controllers (e.g. an IP address of each site master-controller) with which users under the corresponding account are authorized to interact (e.g., issue commands or view reports of data from the site master-controller). The data store 34 may encode such arrangements of data in a variety of formats, including a relational database, program state, hierarchical key-value pairs, a flat file, or other information encoded in a tangible, non-transitory, machine-readable medium, such as a hard drive or random access memory.

The illustrated site server 36 may be operative to interface between the command-center server 14 and the site master-controllers 16 by directing commands received via the web server 32 to the site master-controller 16 to which the command is addressed and receiving process data from the respective site master-controllers to be stored in the data store 34 or presented to the users via the web server 32. In some embodiments, the site server 36 is operative to receive a command via the web server 32, identify an IP address of the site master-controller 16 to which the command is addressed, and send the command to the respective site master-controller 16, for example via an IP address of the command set center server (which may be the same as that of the web server 32 or different) and via a port of the command-center server 14 (which may be different from a port used for the web server 32, or some embodiments may use the same port).

The data store 34, web server 32, and site server 36 may be co-located, for example in a single computing device, or these components 32 and 34 may be distributed across a number of computing devices, either co-located or physically distributed. The web server 32 and site server 36 may be operative to issue queries to the data store 34 to implement requests from the user devices 26 or 28, and the web server 32 may communicate with the site server 36 to effectuate commands.

In some embodiments, each site master-controller 16 controls a respective fluid-handling site 24 (only one of which is shown for site master-controller 18, though each of the other site master-controllers 20 and 22 may be associated with their own, differently located fluid-handling site, or some sites may have multiple site master controllers). The site master-controller 16 may receive commands from the command-center server 14 and implement those commands to completion, for example without further feedback to, and control signals from, the command-center server 14, such that the command can be executed even if a network connection to the command-center server 14 is temporarily lost. Further, the site master-controller 16 may be operative to report process data to the command-center server 14 for storage in the data store 34 and presentation via the web server 32 on user devices 26 and 28.

In some embodiments, the site master-controllers 16 are physically located at an associated fluid-handling site 24. For example, the site master-controller 18 may be connected to the fluid-handling site via a private network through which communications are sent without passing through the public Internet, and in some cases, the site master-controller 18 may be within a mile of the fluid-handling site 24, to give one example of co-location. The site master-controllers 16 may be geographically remote from one another, the command-center server 14, and the user devices 26 and 28 (each of which may also be remote from one another). For example, each of these components may be more than 1 mile from one another or not connected to one another via a private network. In some cases, though, some sites may have multiple site master-controllers co-located at a single site or some user devices may be co-located.

To execute commands at the fluid-handling site 24, the site master-controller 18 translates the received commands into a protocol appropriate for a corresponding fluid-handling device 38 (identified individually by reference numbers 40, 42, 44, 46, and 48). Accordingly, the features of the fluid-handling site 24 are described before addressing internal components of the exemplary site master-controller 18 to explain the environment in which the site master-controller 18 operates.

In this embodiment, the fluid-handling site 24 includes a plurality of fluid-handling devices 38 that are fluidly coupled to a fluid source 50 or a fluid receptacle 52, such that fluids (e.g., liquids or gases) can flow to, from, or through the respective fluid-handling device 38. The illustrated embodiment includes five fluid-handling devices, but other embodiments may include different numbers of such devices coupled to the various site master-controllers 16.

The fluid-handling devices may be any of a variety of different types of devices that handle fluids. For example, the fluid-handling devices may be a valve, a pump, a process chamber (for instance a oil/water separation tank), or a process filter, or level switch. In some cases, the fluid-handling device may include an actuator, for instance an electric motor or a hydraulic drive, by which fluid flow or other parameters are manipulated, a sensor 56 by which process parameters are measured, or a local controller 58 by which power to the actuator 54 is modulated. Fluid-handling devices 38 may include a variety of types of sensors, for instance, a temperature, viscosity, flowrate, fluid level, pressure, conductivity, or other parameter sensor.

The illustrated fluid-handling device 40 is shown with feedback control of the actuator 54 by the local controller 58 based on measurements from the sensor 56, but other embodiments may include an actuator with feed-forward control, including actuators controlled by an on-off switch without sensor feedback. The local controller 58 may be operative to receive a command to drive the actuator 54 from a current setpoint to a target setpoint and control the flow of power (e.g. hydraulic or electric power) to the actuator 54 to implement the requested change of state. For instance, the controller 58 may receive a command to change a speed, pressure, or flowrate of a pump and may respond by increasing or decreasing a flow of electric or hydraulic power to an electrical or hydraulic motor driving such a pump. Or the controller 58 may receive a command to open or close a valve and, in response, may increase or decrease a flow of electric or hydraulic power to a corresponding actuator that opens or closes the valve.

In some cases, the local controllers 58 may have relatively limited processing power, such that more complicated changes in state are executed responsive to multiple commands to the respective fluid-handling device 38. For example, a fluid-handling device 38 with feed-forward control may receive a command to adjust to a target setpoint, return sensor data to the site master-controller 18, and received a subsequent command to adjust further based on a determination made by the site master-controller 18 based on the sensor data. In another example, a stuck-valve may be loosened by a series of commands issued from the site master-controller 18 causing a local controller 58 to oscillate between states, working the stuck-valve loose. Similarly, shocks to up-stream or down-stream fluid-handling devices may be mitigated by a series of commands gradually changing the state of a given fluid-handling device, for instance gradually ramping up or down the speed of a pump or gradually opening or closing a valve. In some embodiments, an action that affects the system, yet originates from outside the system, may use logic from a controller in the local system, such as a relatively drastic or rapid reduction in a specific tank level, which may indicate that a leak in a tank may exists, and the outside logic may provide which tank is experiencing the leak.

The site master-controller 18, in some embodiments, communicates with the fluid-handling devices 38 via a plurality of control buses 60 (individually labeled as 62, 64, and 66). Each control bus 60 may be operative to convey commands to one or more of the fluid-handling devices 38 using a different protocol. In this example, control bus 66 communicates with fluid-handling devices 42 and 40, control bus 64 communicates with fluid-handling device 44, and control bus 62 communicates with fluid-handling devices 46 and 48, but this arrangement is merely exemplary, and other embodiments may include more or fewer control buses, more or fewer fluid-handling devices per control bus, and more or fewer control buses per fluid-handling device. The control buses 60 may be serial or parallel control buses conveying digital or analog signals.

In one particular implementation, intended to serve merely as an example, the control bus 66 conveys commands and data using a serial communication protocol, such as the Modbus remote terminal unit (RTU) protocol, in which commands and other data are encoded in binary signals packaged in frames having redundant bits for detecting errors. The fluid-handling devices 40 and 42 on the bus 66, in this example, each have a unique address on the bus 66 by which commands from the site master-controller 68 are addressed to specific fluid-handling devices 40 or 42, and these addresses may be stored in memory of the site master-controller 18 as described in greater detail below. In some examples, site master-controller 18 acts as a master device on the bus 66, controlling which devices are permitted to transmit signals on the bus 66 at a given point in time. In this example, the fluid-handling devices 42 and 40 may include a bus interface that detects when a command is addressed to the respective fluid-handling device and stores the command for further processing, for example by a local controller 58 that implements the command. For example, fluid-handling device 40 may be a pump, and the bus 66 may convey commands to the local controller 58 to increase the speed of the actuator 54, for example an electric motor speed, to increase a pumping flowrate or pressure. In another example, the site master-controller 18 may issue a command on bus 66 to fluid-handling device 40 to return a value sensed by sensor 56, for example a measured pump speed, pressure, or flowrate.

In another aspect of this particular exemplary implementation, the bus 64 conveys a single value, for example a binary on/off value encoded in a voltage or current, or an analog control signal, encoded in a current or voltage, to one fluid-handling device 44 via a single wire (or pair of wires, if a reference different from ground is used). In some cases, the value may be a voltage ranging from 0 to 5 V, or some other range, in which a relatively low voltage, below a threshold, corresponds to an off signal, and a relatively high voltage, above a threshold, corresponds to an on signal. In some cases, the same command may be conveyed to multiple fluid-handling devices connected in series or parallel, or multiple commands may be conveyed by multiple wires in parallel to a single fluid-handling device or multiple fluid-handling devices, for instance one on-off signal per fluid-handling device. As explained in greater detail below, one or more instances the bus 64 may connect to a data acquisition board of the site master-controller 18 for manipulating voltage or current to encode commands. In one example, the bus 64 conveys a binary value to a local controller for a valve actuator as a voltage-high or voltage-low signal, commanding the valve to open or close, respectively. In some cases, instances of the bus 64 may also return data to the site master-controller 18, for example as an analog signal indicating the state of a sensor. In some embodiments, instances of the bus 64 may connect to sensors on fluid-handling devices that are also connected to the bus 66 or the bus 62, e.g., returning sensor values, while the other buses convey commands.

In another aspect of this particular exemplary implementation, the bus 62 is an Ethernet bus, forming a private local area network by which the site master-controller 18 communicates with fluid-handling devices 46 and 48 via the Ethernet protocol. Examples of various forms of constraints and set point targeting that might be implemented with such communication are described below with reference to local controllers. In this example, data is conveyed in frames of binary data, and each of the site master-controller 18 and the fluid-handling devices 46 and 48 are associated with a respective network address that, when included in such a frame, indicates that the frame is addressed to the associated device. Frames may include redundancy to detect corrupted frames, and access to the bus 62 may be controlled in a distributed fashion, by each device sensing whether a transmission by the device caused a collision on the bus 62, e.g., using carrier-sense multiple-access techniques with collision detection. In this example, fluid-handling devices 46 and 48 may include network interfaces, such as network interface cards or integrated devices that detect frames addressed to the corresponding fluid-handling device 46 or 48, capture the frames, and store commands encoded in the frames (e.g., in a buffer) for subsequent processing by a local controller. Similarly, the fluid-handling devices 46 and 48 may return data to the site master-controller 18, for example data from sensors of the fluid-handling devices, using the Ethernet protocol.

As noted above, the site master-controller 18, in this embodiment, like the other site master-controller 20 and 22, is operative to receive commands from the command-center server 14 and translate those commands in accordance with both protocols of the respective buses 62, 64, or 66 and command formats supported by the fluid-handling devices 38 (e.g., command codes, on-off signals, application-program interfaces, and the like, depending on the device). To this end, in this embodiment, the site master-controller 18 includes a network interface 68, a site management module 70, a protocol multiplexer 72, command translators 74 (individually labeled as 76, 78, 80), controllers 82 (individually labeled as 84, 86, 88, 90, 92, and 94), and input/output modules 96 (individually labeled as 98, 100, and 102). The site master-controller 18 may also include a report buffer 104 that stores data to be reported back to the command-center server 14.

The illustrated network interface 68 is operative to communicate with the command-center server 14 via the Internet 30 (e.g., via the Internet and other networks, such as a local area network, a cellular network, or the like). In some embodiments, the site management module 70 communicates with the network interface 68 via application program interfaces of an operating system in which the site master-controller 18 is executed.

The illustrated site-management module 70 is operative to coordinate the operation of the other components of the site master-controller 18. In some cases, the site management module 70 monitors a network socket defined by an Internet protocol address and port of the site master-controller 18 and handles events, e.g., incoming commands, from the network socket. In some embodiments, the site-management module 70 is implemented with multiple threads, in a system in which one thread sends and receives data request; one thread controls and monitors the current state of the system, causing other threads to be synced with current information; one thread writes to writeable devices (e.g., devices having memory) to set the target state of each device; one thread that handles server interaction for updating and receiving; one thread that handles user interaction (e.g., presenting interfaces on an local display, receiving user input, and handling events from such input); and one thread that eliminates threads that become problematic.

The site manager module 70 may also be operative to transmit data with the network socket, using the network interface 68, to the command-center server 14. For example, the site manager module 70 may periodically retrieve data from the report buffer 104, such as alarms, measurements from sensors, and other data associated with the fluid-handling site 24, and push this data to the command-center server 14. Or the site management module 70 may be operative to receive requests for such data being pulled from the command-center server 14, and retrieve the corresponding data from the report buffer 104 for transmission back to the command-center server 14. Further, the site manager module 70 may be operative to request measurements, alarms, and other data from the fluid-handling devices via the components 72, 74, 82, and 96, and store this data in the report buffer 104 for transmission to the command-center server 14.

In this embodiment, when the site management module 70 receives a command via the network interface 68, or issues its own command (e.g., to poll sensors or alarm logs), the command is conveyed to a protocol multiplexer 72, which may be operative to determine which control bus 60 and fluid-handling device 38 will receive a corresponding translated command. For example, the protocol multiplexer 72 may store in memory records for communicating with the fluid-handling devices 38. Each record may correspond to a individual fluid-handling device 38 or an individual actuator or sensor of a fluid-handling device, and each record may include a unique identifier of the corresponding device, actuator, or sensor; a control bus address of the device, actuator, or sensor (for those components on a control bus that is addressable); an identifier of the control bus 62, 64, or 66 through which the site master-controller 18 communicates with the device, actuator, or sensor; and an identifier of the protocol through which such communication occurs.

When a command is received at the protocol multiplexer 72, in some embodiments, the command includes the identifier of the device, actuator, or sensor to which the command is directed, and using this identifier, the protocol multiplexer 72 retrieves the corresponding record from memory to identify the appropriate protocol. In this example, based on the protocol in the record, the protocol multiplexer 72 selects among the command translators 74, each of which corresponds to a different protocol. For example, the command translator 80 may correspond to a protocol of control bus 66, such as the modbus RTU protocol; the command translator 78 may corresponds to a protocol of the control bus 64, such as a binary or analog voltage or current signal conveyed via a data acquisition board; and the command translator 76 may corresponds to a protocol of the control bus 62, such as the Ethernet protocol.

The command translators 74 may be operative to translate a received command from an input format to a format configured to effectuate changes in the fluid-handling devices 38. For instance, a generic command to open a valve may be sent from the control-center server 14, and that command may be translated to differently depending on the specific protocol used to communicate with the corresponding valve at a given site, with different sites potentially employing different protocols for the task. Translating commands may abstract the details of the site-specific implementations away from those implementing the command-center server 14, facilitating relatively rapid deployment of new features or sites.

In one example of translation, the command translator 80 may receive a command to increase a pump speed, and the command translator may determine a corresponding command via calculation or look-up table, such as a modbus function code and associated data, that when conveyed via the control bus 66 causes a corresponding fluid-handling device 40 or 42 to change state. In some embodiments, prior to execution, the command is checked for validity, to ensure the current conditions of the system warrant that the commanded action occur to preventing harm to the fluid-handling devices.

For example, some embodiments may store in memory accessible to the command translator 80 system constraints describing acceptable patterns of input and output parameters. The system constraints may be selected to prevent damage to the system, e.g., a maximum speed for a pump, a maximum or minimum liquid height for a tank, a maximum or minimum fluid pressure, a maximum or minimum flow rate, an impermissible pattern of open valves that would leak oil outside of the system, etc. A command may be compared against these constraints to determine whether the command would cause the system to violate one of the constraints. In response to determining that the command would violate a constraint, the command may be rejected, an override confirmation may be requested from the operator, or the command may be executed to the extent permitted by the constraints, for instance.

Some embodiments may execute the translated commands in different modes. For instance, in an automatic mode, the command translator 80 may select set points to keep the system within the above-described constraints, execute a process recipe in which a collection of set points are targeted, or to target other output set points given the above described constraints. In another example, the system may operate in a mixed automatic mode in which the user selects which devices are manually controlled while other devices are automatically controlled. In a third example, a manual mode, each of the devices may be controlled manually.

In another example, the command translator 78 may be operative to determine whether a command corresponds to a particular voltage or current on an individual instance of the control bus 64. For example, a command to dislodge a stuck valve may be translated by the command translator 78 into a sequence of on and off signals conveyed via a high and low voltage on an individual wire corresponding to bus 64.

In another example, the command translator 76 may be operative to translate commands into a format configured to change the state of fluid-handling devices 46 or 48. Or in some embodiments, command translator 76 is operative to pass through and un-translated command if appropriately formatted as received from the command-center server 14.

Some embodiments may include controllers 82 operative to execute control routines implicated by the translated commands on an individual device 38, actuator 54, or sensor 56. To this end, the commands translator 74, in addition to transmitting commands, may also route the translated command to a controller 82 corresponding to the specific device, actuator, or sensor to which the command is directed. The controllers 82 may determine set points corresponding to (or conveyed in) the command, send control signals configured to drive the fluid-handling device to the set points, and receive feedback from the fluid-handling device 38 indicative of whether the fluid-handling device 38 has achieved the target set point. In some embodiments, the controllers 82 include proportional-integral-derivative controllers for exercising feedback control, or the controllers 82 may include feed forward control algorithms (e.g., look-up tables or formulas for calculating commands based on set points). Further, in some embodiments, the controllers 82 may change the set point over time in accordance with the received command, for example a command to gradually ramp up a motor speed, a command to gradually open a valve, or a command to oscillate the position of a valve to dislodge a stuck valve. Algorithms for changing the set point may be stored in memory accessible to the controllers 82 responsive to a translated command implicating the specific algorithm.

The illustrated input/output modules 26 include, in some embodiments, link-layer devices that accommodate the particular features of the physical medium with which control buses 62, 64, and 66 are implemented. In some cases, the input/output modules 96 also perform encoding and decoding at the network and transport layer, for example packaging data in appropriately structured frames for the respective control bus 60. In one example, the input/output module 102 includes a modbus modem, the input/output module 100 includes a data acquisition board (for example a printed circuit board having one or more digital-to-analog converters or analog-to-digital converters), and the input/output module 98 includes an Ethernet network interface card.

The site master-controller 18, thus, may be operative to receive commands from the site server 36 of the command-center server 14, translate those commands, identify the appropriate control bus 60 and, if needed, address on the control bus, and implement the command once received, even if network access is lost after the command is issued from the command-center server 14. Further, the site master-controller 18, in some embodiments, is operative to retrieve sensor data, alarms, and other site data, and buffer such data in the report buffer 104, before the data is periodically returned to the command-center server 14, such that buffered data is not lost if network access ceases intermittently. Accordingly, some embodiments provide control and monitoring of remote fluid handling sites 24 that is relatively robust to interruptions in network service, and some embodiments facilitate such monitoring and control via a web browser on user devices 26 and 28, such that the addition of new devices or users is relatively simple compared to systems that require special purpose applications. Again though, not all embodiments provide these benefits, and some embodiments may provide other benefits.

The components of the site master-controller 18 and command-center server 14 are described above with reference to discrete functional blocks and as discrete unitary components, but it should be understood that software or hardware by which these functional blocks or components are implemented may be distributed across multiple computing systems or multiple processes within a computing system, and code, stored in a tangible, non-transitory, machine-readable medium, for providing this functionality or the functionality described below may be intermingled, conjoined, divided, or otherwise differently organized than the manner in which the functional blocks are illustrated.

Figure 2:
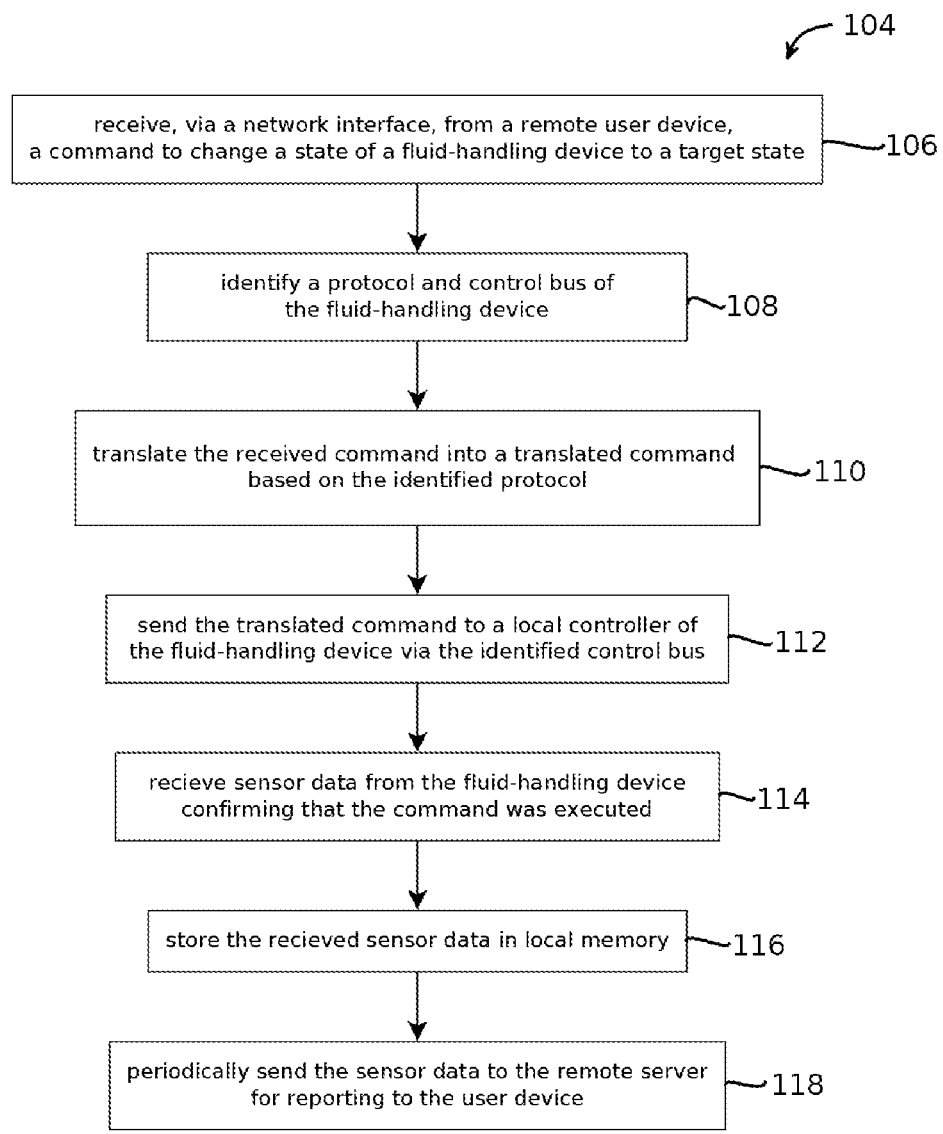
FIG. 2 illustrates an example of a process by which remote control of fluid-handling devices is exercised in accordance with some embodiments.

FIG. 2 illustrates an embodiment of a process 104 for exercising remote control of a fluid-handling site. The process 104 may be performed by the above-described site master-controllers 16, though embodiments are not limited to the implementations described above. Further, embodiments may include additional steps, fewer steps, and steps in a different order from the manner in which the process 104 is illustrated, which is not to suggest that any other feature described herein is required in all embodiments or cannot be modified.

In some embodiments, the process 104 includes receiving, via a network interface, from a remote user device, (e.g., via a command-center server) a command to change a state of a fluid-handling device to a target state, as illustrated by block 106. The command may be received from, for example, the above-describes site server 36, which may have received the command from a remote user device via a web browser of the user device. Further, the command to change the fluid-handling device to a target state may include a command that changes the fluid-handling device to a plurality of different states over time, such as a command to ramp up or down a motor speed or oscillate some parameter.

In some embodiments, the process 104 includes identifying a protocol and control bus of the fluid-handling device, as illustrated by block 108. Identifying a protocol and control bus may include parsing an identifier of a device, actuator, or sensor from the received command and retrieving a corresponding record based on the identifier, the record including an identifier of the protocol and control bus. In some embodiments, the retrieved record may also include an identifier of a control bus address of the corresponding device, actuator, or sensor.

In some embodiments, the process 104 includes translating the received command into a translated command based on the identified protocol, as illustrated by block 110. Examples of such translation are described above with reference to the command translators 74.

The process 104 may also include sending the translated command to a local controller of the fluid-handling device via the identified control bus, as illustrated by block 112. Sending the translated command may include exercising feedback control of the fluid-handling device based on sensor data received from the fluid-handling device by adjusting a set point sent to the local controller. Or in some use cases, sending the translated command may include sending a sequence of set points that change over time.

In some embodiments, the process 104 includes receiving sensor data from the fluid-handling device confirming that the command was executed, as illustrated by block 114. As with the other features described herein, not all embodiments include this step. Using this data, some embodiments may exercise feedback control or may retrieve sensor measurements following the execution of a command for reporting to the user device. In some cases, the sensor data is retrieved regardless of whether a command was issued, for example periodically to monitor the state of the fluid-handling device. In one example, the fluid-handling device is an oil/water separation tank, and a set point of a pump is adjusted to change a fluid level in the tank, e.g., a level at which oil meets water or a level of the oil.

In some embodiments, the received sensor data is stored in local memory, as illustrated by block 116. For example, the received sensor data may be stored in the above-described report buffer 104.

In some embodiments, the process 104 further includes periodically sending the sensor data to the remote server for reporting to the user device, as illustrated by block 118. Periodically, data from the report buffer may be transmitted to the above-described command-center server 14 for compilation of reports requested by user devices 26 to 28. Similarly, alarms or other log data issued by fluid-handling devices may also be retrieved, stored, and transmitted to the command-center server 14 for reporting.

Thus, systems implementing the process 104, in some embodiments, offer relatively robust control and monitoring of fluid-handling devices that are geographically distributed. This is expected to lower the costs associated with operating such fluid-handling devices and facilitate the extraction of petroleum products and other processing of fluids.

Figure 3:
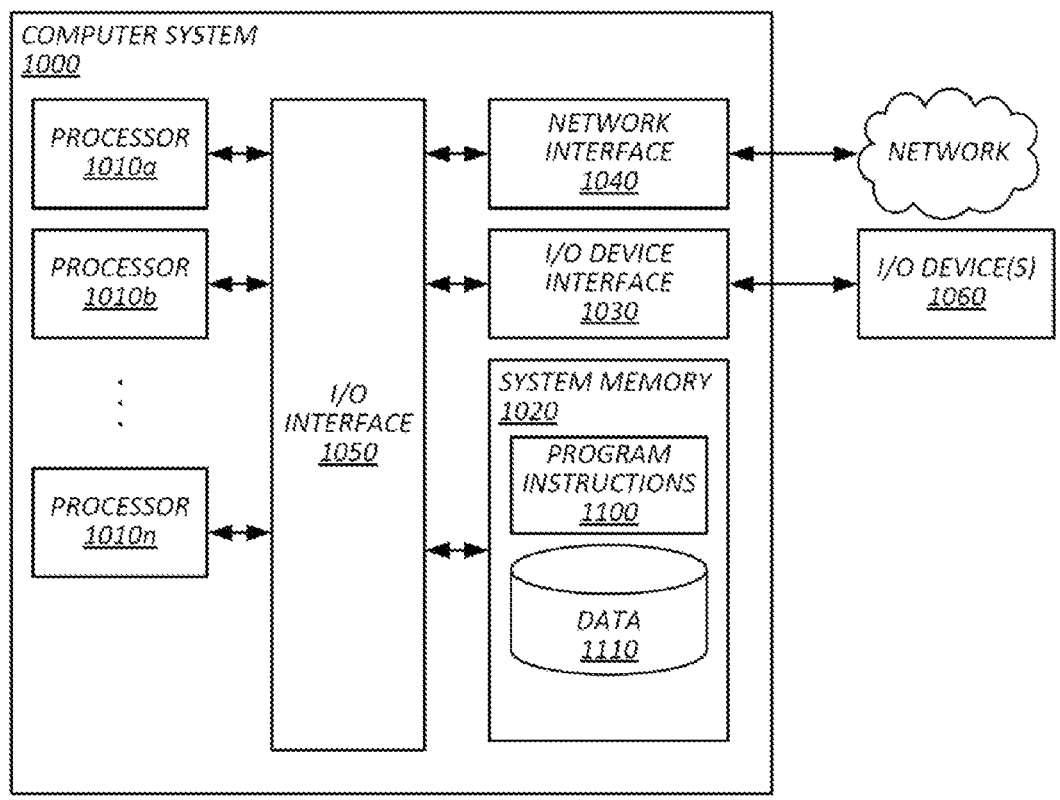
FIG. 3 illustrates an example of a computing device by which the hardware and processes of FIGS. 1 and 2 may be implemented.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030 and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a", "an" and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A method, comprising:
    receiving, via a network interface, a plurality of user-directed instructions to control fluid-handling devices that monitor or control one or more fluids at an oil well, a petro water disposal or re-injection facility, or a petroleum pumping station, the plurality of instructions being received encoded in a shared protocol;
    obtaining a target state of at least one of the fluid-handling devices based on at least some of the plurality of instructions, wherein obtaining a target state of at least one of the fluid-handling devices based on at least some of the plurality of instructions comprises:
        after receiving the instructions, determining a plurality of different target states of the at least one of the fluid-handling devices, the plurality of different states each corresponding to different times;
    for each of the plurality of instructions, selecting a respective protocol or protocols from among a plurality of protocols different from the shared protocol, wherein the respective fluid-handling device or devices to which the respective instruction is directed are responsive to the selected respective protocol or protocols, wherein at least some of the selected protocols are different from one another;
    after determining the plurality of different target states, translating each received instructions into one or more translated instructions encoded in the selected respective protocol or protocols, the one or more translated instructions including the determined plurality of different target states; and
    sending each translated instructions to at least the fluid-handling device to which the respective translated instruction is directed, wherein at least some of the translated instructions are effective to cause the at least one of the fluid-handling devices to attempt to achieve the target state.

2. The method of claim 1, wherein selecting a respective protocol or protocols comprises:
    parsing, from at least one of the received instructions, an identifier of one of the fluid-handling devices; and
    based on the parsed identifier, retrieving from memory one or more records, including an identifier of at least one selected respective protocol and an identifier of a bus to which the identified fluid-handling device is communicatively coupled.

3. The method of claim 2, wherein sending each translated instructions to at least the fluid-handling device to which the respective instruction is directed comprises:
    sending an address of the identified fluid-handling device on the identified bus in association with at least some of the translated instructions.

4. The method of claim 2, wherein sending each translated instructions to at least the fluid-handling device to which the respective instruction is directed comprises:
    providing at least some of the translated instructions to a link-layer device connected to the identified bus; and
    encoding the translated instructions with the link-layer device in accordance with the physical medium by which the identified bus is implemented.

5. The method of claim 2, wherein sending each translated instruction to at least the fluid-handling device to which the respective instruction is directed comprises:
   providing at least some of the translated instructions to a digital-to-analog converter connected to the identified bus; and
   sending the at least some of the translated instructions to the identified fluid-handling device with the digital-to-analog converter.

6. The method of claim 1, wherein:
the at least some of the translated instructions are effective to cause the at least one of the fluid-handling devices to attempt to achieve the plurality of different target state at the different times.

7. The method of claim 6, comprising:
losing a network connection by which at least some of the plurality of user-directed instructions are received; and
after losing the network connection, continuing to cause the at least one of the fluid-handling devices to attempt to achieve the plurality of different target state at the different times and continuing to execute instructions among the plurality of received instructions received prior to losing the network connection before entering an automatic mode.

8. The method of claim 6, wherein the plurality of different states ramp up or ramp down a motor speed of a motor of the at least one of the fluid-handling devices.

9. The method of claim 6, wherein the plurality of different states oscillate a physical state of the at least one of the fluid-handling devices.

10. The method of claim 1, wherein at least some of the received instructions identify a process recipe in which a collection of target states are targeted for at least a plurality of the fluid-handling devices.

11. The method of claim 1, wherein at least some of the received instructions identify an automatic mode in which a collection of target states are computed to operate within process constraints.

12. The method of claim 1, wherein at least some of the received instructions correspond to a manual mode in which an individual one of the fluid-handling devices is remotely controlled by a user.

13. The method of claim 1, comprising:
   before sending at least one of the translated instructions, accessing a constraint value stored in memory;
   determining that the at least one of the translated instructions will not violate the constraint value; and
   in response to the determination, sending the at least one of the translated instructions.

14. The method of claim 1, comprising;
receiving additional instructions via the network interface;
determining that the additional instructions are directed to a given fluid-handling device responsive to the shared protocol; and
in response to the determination, sending an un-translated instruction to the given fluid-handling device.

15. The method of claim 1, wherein a given one of the fluid-handling devices comprises a proportional-integral-derivative controller, and wherein at least some of the translated instructions adjust a set point of the proportional-integral-derivative controller.

16. The method of claim 1, comprising:
   receiving, at a remote server system, via a network, user credentials from a user device;
   identifying, with the remote server system, an account based on the user credentials, the account including identifiers of the oil well, the petro water disposal or re-injection facility, or the petroleum pumping station and at least one other facility;
   receiving from the user device, at the remote server system, a request corresponding to at least one of the received instructions, the request including an identifier of the oil well, the petro water disposal or re-injection facility, or the petroleum pumping station;
   identifying, with the remote server system, an Internet Protocol address at which the network interface is reachable based on the identifier of the oil well, the petro water disposal or re-injection facility, or the petroleum pumping station; and
   sending, from the remote server system, the at least one of the received instructions to the identified Internet Protocol address in response to the request.

17. The method of claim 16, wherein the user device is a smartphone executing a smartphone application that communicates with the remote server system via an application program interface.

18. The method of claim 16, wherein receiving from the user device the request corresponding to the at least one of the received instructions comprises:
   receiving the request from a web interface in a web browser executing on the user device.

19. The method of claim 1, comprising:
producing oil or gas;
disposing of petro water; or
re-injecting petro water.

20. A system, comprising:
one or more processors;
a network interface coupled to at least some of the processors;
a plurality of link-layer devices coupled to at least some of the processors, each link-layer device configured to communicate with one or more fluid-handling devices via one or more busses; and
memory storing instructions that when executed by at least some of the processors effectuate operations comprising:
   receiving, via the network interface, a plurality of user-directed instructions to control fluid-handling devices that monitor or control one or more fluids at an oil well, a petro water disposal or re-injection facility, or a petroleum pumping station, the plurality of instructions being received encoded in a shared protocol;
   obtaining a target state of at least one of the fluid-handling devices based on at least some of the plurality of instructions, wherein obtaining a target state of at least one of the fluid-handling devices based on at least some of the plurality of instructions comprises:
      after receiving the instructions, determining a plurality of different target states of the at least one of the fluid-handling devices, the plurality of different states each corresponding to different times;
   for each of the plurality of instructions, selecting a respective protocol or protocols from among a plurality of protocols different from the shared protocol, wherein the respective fluid-handling device or devices to which the respective instruction is directed are responsive to the selected respective protocol or protocols, wherein at least some of the selected protocols are different from one another;
   after determining the plurality of different target states, translating each received instructions into one or more translated instructions encoded in the selected respective protocol or protocols, the one or more translated instructions including the determined plurality of different target states; and sending each translated instructions to at least the fluid-handling device to which the respective translated instruction is directed via one of the link-layer devices, wherein at least some of the translated instructions are effective to cause the at least one of the fluid-handling devices to attempt to achieve the target state.

21. The system of claim 20, wherein selecting a respective protocol or protocols comprises:

parsing, from at least one of the received instructions, an identifier of one of the fluid-handling devices; and based on the parsed identifier, retrieving from memory one or more records, including an identifier of at least one selected respective protocol and an identifier of a bus to which the identified fluid-handling device is communicatively coupled.

22. The system of claim 21, wherein sending each translated instructions to at least the fluid-handling device to which the respective instruction is directed comprises:

sending an address of the identified fluid-handling device on the identified bus in association with at least some of the translated instructions.

23. The system of claim 21, wherein sending each translated instructions to at least the fluid-handling device to which the respective instruction is directed comprises:

providing at least some of the translated instructions to a link-layer device connected to the identified bus; and encoding the translated instructions with the link-layer device in accordance with the physical medium by which the identified bus is implemented.

24. The system of claim 21, wherein sending each translated instruction to at least the fluid-handling device to which the respective instruction is directed comprises:

providing at least some of the translated instructions to a digital-to-analog converter connected to the identified bus; and sending the at least some of the translated instructions to the identified fluid-handling device with the digital-to-analog converter.

25. The system of claim 20, wherein:

the at least some of the translated instructions are effective to cause the at least one of the fluid-handling devices to attempt to achieve the plurality of different target state at the different times.

26. The system of claim 25, the operations comprising:

losing a network connection by which at least some of the plurality of user-directed instructions are received; and after losing the network connection, continuing to cause the at least one of the fluid-handling devices to attempt to achieve the plurality of different target state at the different times and continuing to execute instructions among the plurality of received instructions received prior to losing the network connection before entering an automatic mode.

27. The system of claim 25, wherein the plurality of different states ramp up or ramp down a motor speed of a motor of the at least one of the fluid-handling devices.

28. The system of claim 25, wherein the plurality of different states oscillate a physical state of the at least one of the fluid-handling devices.

29. The system of claim 20, wherein at least some of the received instructions identify a process recipe in which a collection of target states are targeted for at least a plurality of the fluid-handling devices.

30. The system of claim 20, wherein at least some of the received instructions identify an automatic mode in which a collection of target states are computed to operate within process constraints.

31. The system of claim 20, wherein at least some of the received instructions correspond to a manual mode in which an individual one of the fluid-handling devices is remotely controlled by a user.

32. The system of claim 20, the operations comprising:

before sending at least one of the translated instructions, accessing a constraint value stored in memory;

determining that the at least one of the translated instructions will not violate the constraint value; and in response to the determination, sending the at least one of the translated instructions.

33. The system of claim 20, the operations comprising;

receiving additional instructions via the network interface;

determining that the additional instructions are directed to a given fluid-handling device responsive to the shared protocol; and in response to the determination, sending an un-translated instruction to the given fluid-handling device.

34. The system of claim 20, wherein a given one of the fluid-handling devices comprises a proportional-integral-derivative controller, and wherein at least some of the translated instructions adjust a set point of the proportional-integral-derivative controller.

35. The system of claim 20, comprising:

a remote server system having one or more processors and memory storing instructions that effectuate operations comprising:

receiving, at the remote server system, via a network, user credentials from a user device;

identifying, with the remote server system, an account based on the user credentials, the account including identifiers of the oil well, the petro water disposal or re-injection facility, or the petroleum pumping station and at least one other facility;

receiving from the user device, at the remote server system, a request corresponding to at least one of the received instructions, the request including an identifier of the oil well, the petro water disposal or re-injection facility, or the petroleum pumping station;

identifying, with the remote server system, an Internet Protocol address at which the network interface is reachable based on the identifier of the oil well, the petro water disposal or re-injection facility, or the petroleum pumping station; and sending, from the remote server system, the at least one of the received instructions to the identified Internet Protocol address in response to the request.

36. The system of claim 35, wherein the user device is a smartphone executing a smartphone application that communicates with the remote server system via an application program interface.

37. The system of claim 35, wherein receiving from the user device the request corresponding to the at least one of the received instructions comprises:

receiving the request from a web interface in a web browser executing on the user device.

38. The system of claim 20, comprising:

an oil or gas well fluidly coupled to the fluid-handling devices;

a petro water disposal facility fluidly coupled to the fluid-handling devices; or a petro water reinjection facility fluidly coupled to the fluid-handling devices.

39. The system of claim 20, comprising:
a plurality of fluid-handling devices coupled to at least some of the link-layer devices via at least some of a plurality of busses.

\* \* \* \* \*